United States Patent [19]
Anderson

[11] Patent Number: 5,844,588
[45] Date of Patent: Dec. 1, 1998

[54] DMD MODULATED CONTINUOUS WAVE LIGHT SOURCE FOR XEROGRAPHIC PRINTER

[75] Inventor: Charles H. Anderson, Dallas, Tex.

[73] Assignee: Texas Instruments Incorporated, Dallas, Tex.

[21] Appl. No.: 371,348

[22] Filed: Jan. 11, 1995

[51] Int. Cl.$^6$ .............................. B41J 2/47; G02B 26/02
[52] U.S. Cl. .......................... 347/135; 347/255; 359/292
[58] Field of Search .................................. 347/135, 239, 347/255, 238, 134; 359/292, 223, 224

[56] References Cited

U.S. PATENT DOCUMENTS

| | | | |
|---|---|---|---|
| 3,750,189 | 7/1973 | Fleisher | 347/137 |
| 4,727,380 | 2/1988 | Miura et al. | 347/238 |
| 5,028,939 | 7/1991 | Hornbeck et al. | 347/134 X |
| 5,041,851 | 8/1991 | Nelso | 347/134 |
| 5,061,049 | 10/1991 | Hornbeck | 359/224 |
| 5,105,207 | 4/1992 | Nelson | 347/131 |
| 5,105,299 | 4/1992 | Anderson et al. | 347/134 X |
| 5,105,369 | 4/1992 | Nelson | 364/525 |
| 5,151,718 | 9/1992 | Nelson | 347/130 |
| 5,155,778 | 10/1992 | Magel et al. | 385/18 |
| 5,159,485 | 10/1992 | Nelson | 359/291 |
| 5,345,521 | 9/1994 | McDonald et al. | 385/19 |

FOREIGN PATENT DOCUMENTS 0 295 673   12/1988   European Pat. Off. ................ 347/135

OTHER PUBLICATIONS

Moriyama, S.; Kondou, Y.; and Arimoto, A., "Fabrication of nonaxisymmetric aspheric lenses for laser printers", Proceedings of the SPIE—The International Society for Optical Engineering (1989), vol. 1167, pp. 219–227 [Abstract Only], 1989.

*Primary Examiner*—David F. Yockey
*Attorney, Agent, or Firm*—Robert C. Klinger; James C. Kesterson; Richard L. Donaldson

[57] ABSTRACT

An illumination system (10) for exposing a xerographic printing apparatus (12). The system (10) includes a DMD-type imaging spatial light modulator (46), and a DMD-type optical switch (26) for modulating the intensity of the source light (15) irradiating the imaging DMD (46). A single conventional continuous wave tungsten lamp (14) is implemented with its light energy directed by a condensing lens (20) onto the DMD optical switch (26). The DMD optical switch (26) modulates the incident light (15), and passes reflected light to a light integrator (38), which in turn homogenizes and increases the aspect ratio of the light. The light integrator (38) directs the homogenized light via an anamorphic lens (40) onto the imaging DMD (46). The light energy provided to the imaging DMD (46) is precisely modulated in intensity, while remaining uniformly disbursed. The combination incandescent lamp (14) and optical DMD switch (26) offers a low cost, high-intensity alternative to LED arrays.

17 Claims, 2 Drawing Sheets

DMD MODULATED CONTINUOUS WAVE LIGHT SOURCE FOR XEROGRAPHIC PRINTER

CROSS REFERENCE TO RELATED APPLICATIONS

Cross reference is made to the following patent co-pending applications, the teachings of which are incorporated herein by reference:

| SERIAL # | NAME | FILED |
|---|---|---|
| 08/221,739 | Illumination Control Unit for Display System with Spatial Light Modulator | 3-31-94 |
| 07/809,996 | System and Method for Achieving Gray Scale Spatial Light Modulator Operation | 12-18-91 |
| 08/038,398 | Process and Architecture for Digital Micromirror Printer | 03-29-93 |
| 08/038,391 | Gray Scale Printing Using Spatial Light Modulators | 03-29-93 |

TECHNICAL FIELD OF THE INVENTION

This invention relates generally to an image display system such as a xerographic printer, and more particularly, to an illumination system providing high-intensity modulated light which facilitates gray scale printing.

BACKGROUND OF THE INVENTION

Semiconductor spatial light modulators (SLM's) are one viable solution to realizing high quality, affordable xerographic printers. One promising SLM technology suitable for both printers and displays is the digital micromirror device (DMD) manufactured by Texas Instruments Incorporated of Dallas Tex. The DMD is a monolithic semiconductor device having a linear or area array of bi-stable movable micromirrors fabricated over an array of corresponding addressing memory cells. One embodiment of a xerographic printer implementing a tungsten light source focused via optics on an imaging DMD mirror array is disclosed in U.S. Pat. No. 5,041,851 to Nelson, entitled "Spatial Light Modulator Printer and Method of Operation", assigned to the same assignee as the present application and the teachings included herein by reference.

In a xerographic printer implementing an imaging DMD spatial light modulator, it is desired to uniformly illuminate the DMD mirror array with a homogeneous light source such that each pixel mirror of the array modulates a uniform intensity portion of light. This is necessary because the DMD mirror array modulates this light to expose a light sensitive rotating organic printing drum, whereby the intensity and duration of the modulated light directed thereon determines the relative exposure of the charged drum. The exposed portion of the drum comprises a latent image, wherein a quantity of toner will adhere to the drum image, this toner then being transferred to a printing medium such as paper, and fused thereon using heat.

It is also necessary that the energy of the light directed upon the DMD mirror array be of sufficient flux per unit area to fully expose the rotating printing drum to obtain a dark image. If insufficient light energy is modulated and directed to the drum by the DMD mirror array, the printing drum may not be fully exposed, thus degrading the contrast of the image printed on a printing medium.

U.S. Pat. No. 5,159,485 to Nelson, entitled "System and Method for Uniformity of Illumination for Tungsten Light", assigned to the same assignee of the present invention and the teachings included herein by reference, discloses an anamorphic optical path arranged such that the vertical component of the source light is compressed to match the physical shape of the DMD mirror array. The embodiment disclosed dramatically increases the optical efficiency of the system, whereby light energy is compressed to irradiate the DMD mirror array more intensely from a given light source, such as a tungsten lamp.

U.S. Pat. No. 5,151,718 to Nelson, entitled "System and Method for Solid State Illumination for DMD Devices", also assigned to the same assignee of the present invention and the teachings included herein by reference, discloses an array of LED emitters constructed to efficiently replace the conventional tungsten source lamp. The LED array is geometrically configured, and can be electrically operated by strobing to vary the brightness of light to individual mirror pixels to achieve gray scale imaging, and reduce fuzzy line images. Each of the LED's in the array can be provided with a lens to help columnate the light through optics and onto the DMD mirror array. Using LED's, light is efficiently directed and focused onto the DMD mirror array, with little light being wasted and directed elsewhere. Less optical energy is required of the light source compared to a conventional tungsten lamp to illuminate the DMD mirror array with a particular light intensity. The LED's can be quickly turned on and off, thereby providing the ability to modulate the light energy directed upon the DMD mirror array, and consequently, helps achieve gray scale printing. For instance, during a given line print cycle, the LED can be on for 50% of the cycle time to irradiate the DMD array with half the light energy available for that particular time interval. However hi-power arrays of multiple LED emitters are relatively expensive compared to conventional tungsten lamps. Moreover, the best state of the art LED devices suitable for electro-photography are known to only reliably produce 200 milliwatts each. Accordingly, the alignment of the optics is critical to ensure that the energy of each LED is directed upon the DMD mirror array. That is to say, the LED array may not produce sufficient and uniform light energy should one LED fail.

U.S. Pat. No. 5,105,207 to Nelson, entitled "System and Method for Achieving Gray Scale DMD Operation", assigned to the same assignee as the present invention and the teachings incorporated herein by reference, discloses a system for enhancing resolution of a xerographic process by submodulation of each individual pixel. The submodulation is achieved by anamorphically reducing the square pixel presentation of light rays to a rectangle having a number of controllable segments within each square pixel scanned line. A conventional tungsten lamp is incorporated in this embodiment.

It is desirable to provide a low cost, high intensity optical system whereby the DMD mirror array can be uniformly illuminated with high intensity light. Moreover, it is desirable to provide a high intensity light source which can be modulated in intensity to effect gray scale printing. Providing a low cost, single light source is preferred. The optical system should be easy to align, whereby any degradation in the light source would be uniformly presented to the DMD array, and would not noticeably degrade the printing quality of the xerographic printer.

SUMMARY OF THE INVENTION

The present invention achieves technical advantages as an illumination system by implementing a DMD as a reflective optical switch modulating a continuous wave light source. The DMD optical switch comprises thousands of tiny micromirrors, each modulating incident light and directing the modulated light into a light integrator. The modulated light directed into the light integrator is homogenized, and uniformly illuminates a second imaging DMD spatial light modulator.

In the preferred embodiment of the present invention, an illumination system for exposing a xerographic printing apparatus is provided. This illumination system comprises a spatial light modulator receiving and modulating an incoming variable flux density light beam to expose the xerographic printing apparatus. A light source provides a continuous wave light, and an optical switch converts the incoming continuous wave light to the variable flux density light beam, and passes the variable flux density light beam to the spatial light modulator.

Preferably, the optical switch comprises a reflective-type optical switch comprising a DMD. The spatial light modulator is offset at least 40 degrees from the continuous wave light source with respect to the optical switch, thereby keeping the optical elements from interfering with the modulated light beam. In addition, the illumination system has a short front-to-back depth. The light source preferably comprises a incandescent lamp, and the imaging spatial light modulator preferably comprises a second DMD.

The illumination system further comprises a light integrator positioned between the optical switch and the spatial light modulator homogenizing the variable flux density light beam. The light integrator uniformly illuminates the imaging DMD device, and preferably is triangular in shape. A condensing lens is positioned between the continuous wave light source and the optical switch for concentrating the source light onto the optical switch DMD device. A toroidal lens is positioned between the light integrator and the spatial light modulator, although this device could be replaced with a reflective toroidal mirror to further reduce the front-to-back depth of the illumination system if desired. A spectral filter is preferably positioned between the optical switch and the spatial light modulator, preferably between the optical switch and the light integrator. A control circuit controlls the optical switch, this circuit also controlling the imaging spatial light modulator. Because both the optical switch and the imaging spatial light modulator are both DMD devices, the controlling circuit is suited to control both devices, simultaneously. This permits the imaging DMD to be controlled to achieve gray scale imaging, while also controlling the DMD optical switch to further modulate the source light and achieve gray scale imaging. The DMD optical switch and the DMD spatial light modulator are, in a sense, complementary to each other to achieve gray scale imaging by controlling the on time of the mirrors.

The present invention also achieves technical advantages by providing an illumination system including a light integrator positioned between a light source and a spatial light modulator for homogenizing the light source and increasing the aspect ratio of the light. This preferably triangular light integrator homogenizes the incoming light beam through internal reflection, and preferably illuminates a DMD spatial light modulator. This light integrator eliminates the need for focusing lens to direct incident light to a spatial light modulator, and has the additional advantages of light homogenization, which is especially critical for uniformly illuminating a spatial light modulator, such as a DMD.

DETAIL DESCRIPTION OF THE PREFERRED EMBODIMENT

Figures 1, 5:
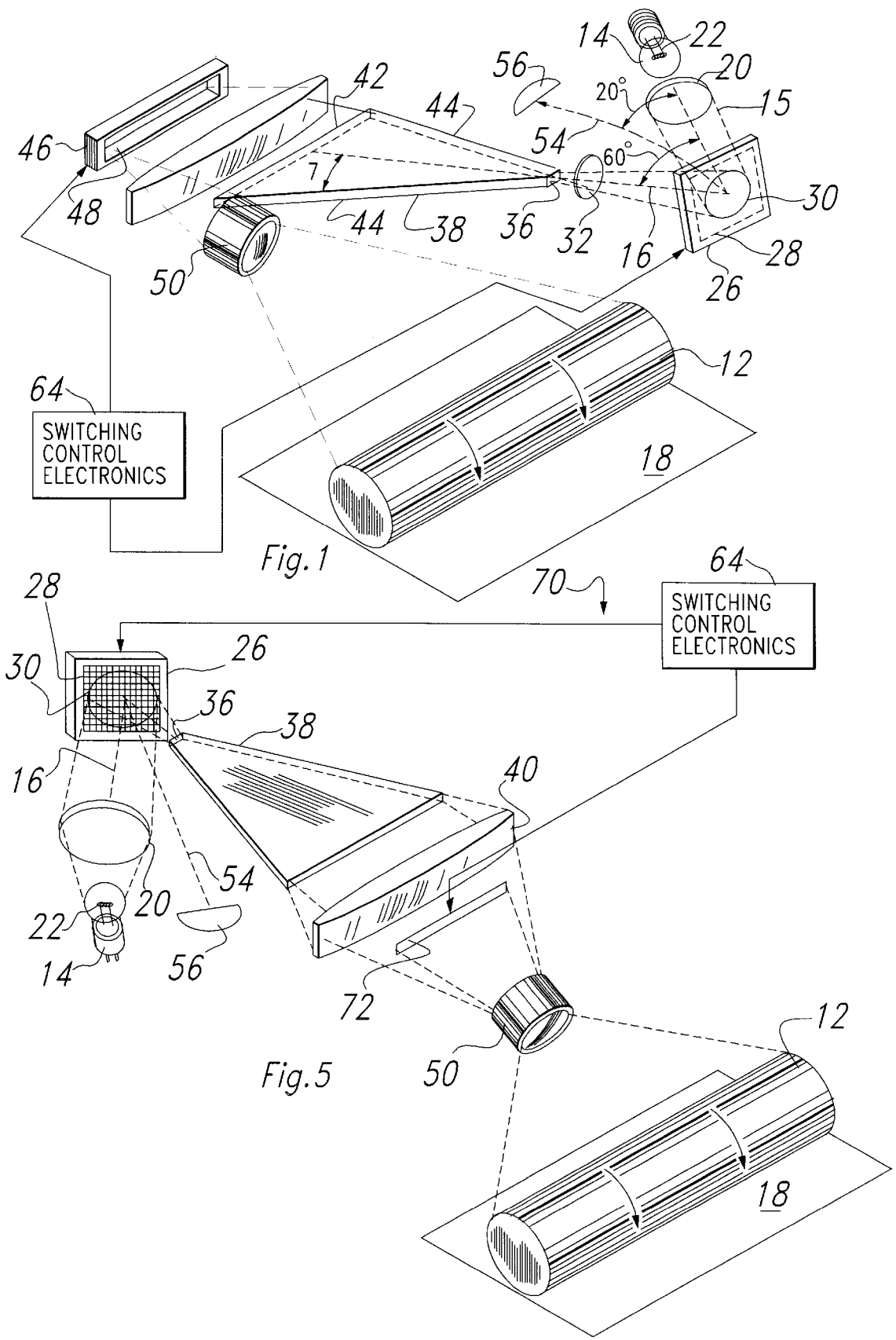
FIG. 1 is a perspective view of the illumination system according to the preferred embodiment of the invention, including a DMD optical switch modulating the intensity of a single continuous wave light source illuminating an imaging DMD via a light integrator to expose a xerographic printing drum.
FIG. 5 is a perspective view of an alternative preferred embodiment illustrating a light value being used to image the printing drum.

Referring now to FIG. 1, there is shown a perspective view of an optical illumination system 10 for selectively exposing a rotating organic xerographic photoreceptor drum 12. Optical system 10 is seen to include a single high-intensity tungsten incandescent lamp 14 generating a high-intensity continuous wave light source 15, this light source 15 being directed along optical path 16 for selectively exposing the xerographic drum 12. Optical system 10 modulates the intensity of this continuous wave light, and also modulates discrete portions of the light to expose and form a latent image on drum 12. This latent image of drum 12 is then used to draw toner which is then transferred to print a printing medium 18, such as paper, and fused thereon with heat.

As viewed from top to bottom, optical system 10 is shown to include an aspheric condensing lens 20 directing light 15 generated by a generally square lamp filament 22 onto an optical reflective-type switch 26. Optical switch 26 is preferably comprised of a DMD-type Spatial Light Modulator (SLM), such as that manufactured by Texas Instruments of Dallas Tex. As shown, the intensity of continuous wave light 15 from filament 22 is directed at a central portion of a mirror array 28 shown in phantom at 30. That is to say, not all mirrors of mirror array 28 will have incident light from lens 20. (See FIGS. 2A and 2B). As will be described shortly, optical switch 26 uniformly modulates the intensity of light 15 directed thereon, and passes on by reflection the light to a spectral filter 32. Spectral filter 32 is well known in the art, filtering out light of unwanted wavelengths, and passing on light in the optical spectrum of 600 to 800 nanometers in wavelength which is compatible with common organic photoconductors. The wavelength of the light which is passed by filter 32 is chosen to correspond with the ideal optical wavelength properties for exposing photoreceptor drum 12. Thus, limitation to these wavelengths is not to be inferred, for it is only preferred that the pass characteristics of filter 32 match the exposure characteristics of drum 12.

Light 15 is seen to be passed by filter 32, and focused by condensing lens 20 to a small proximal face 36 of a generally triangular light integrator 38. Light impinges upon face 36 normal to this surface, and is homogenized by scattering within integrator 38. The homogenized light is uniformly directed to a typically refractive toroidal relay lens 40. Integrator 38 increases the aspect ratio of the incident light from front face 36 to a distal face 42. The distal (exit) face 42 of integrator 38 can be textured or polished to provide a lambertian light director. Thus, the homogenized light is uniformly disbursed from lens face 42 to relay lens 40, as shown. Triangular integrator 36 has two sides 44 angled approximately 15 degrees from the central axis, as shown, to optimize the homogenizing and internal reflection of light of selected wavelengths passed therethrough. Single light source 14 and a single light integrator 36 efficiently homogenizes the light with low cost associated optics. Lens 40 is elongated, and has a height commensurate with the height of distal lens face 42.

The homogenized light is passed by relay lens 40 and directed upon an elongated DMD type imaging spatial light modulator 46. The DMD SLM 46 has a linear array of mirrors which modulate the converged homogeneous light to form an image which exposes the photoreceptor drum 12, as is well known in the art. For additional discussion of how DMD 46 modulates an incoming light source to expose drum 12, cross reference is made to U.S. Pat. No. 5,101,236 to Nelson, et al, entitled "Light Energy Control System and Method of Operation", assigned to Texas Instruments Incorporated, and the teachings of which are included herein by reference. For more detailed discussion of DMD's in general, cross reference is made to U.S. Pat. No. 5,096,279, entitled "Spatial Light Modulator and Method" also assigned to Texas Instruments Incorporated, and the teachings of which are included herein by reference.

Basically, imaging DMD 46 is comprised of a linear array of micromirrors, each having a binary state to either reflect an incident portion of light to or away from a projector lens 50. In the preferred embodiment, imaging DMD 46 is a linear array of micromirrors with dimensions of 64×7,048 mirrors, these mirrors being fabricated over addressing circuitry including an array of memory cells and addressing electrodes (not shown). Gray scale is achieved by modulating these mirrors during a line printing frame, such as disclosed in U.S. Pat. No. 5,105,207 to Nelson, entitled "System and Method for Achieving Gray Scale DMD Operation", and U.S. Pat. No. 5,151,718 to Nelson, entitled "System and Method for Solid State Illumination for DMD Devices", both of these patents being assigned to Texas Instruments Incorporated, and the teachings of both patents included herein by reference.

The incident homogenized light is directed by imaging DMD 46 to the projector lens 50, with the light image focused into lens 50 by lens 40. Projector lens 50 focuses the imaging light on xerographic photoreceptor drum 12. Both relay lens 40 and projector lens 50 ultimately focus the light, whereby lens 40 is used to slightly overfill mirror array 48 with a uniform flux density light, and whereby projector lens 50 focuses the light image generated by DMD 46 onto drum 12.

Referring now back to the front end of optical system 10, a more detailed discussion of the unique light source arrangement will be provided. First, referring to U.S. Pat. No. 5,151,718 to Nelson, entitled "System and Method for Solid State illumination for DMD Devices", it can be seen that one prior art arrangement for modulating a light source, which is then directed on and illuminates a DMD imaging array, can comprise an array of LED's. These LED's can be modulated to control the intensity of light passed to the imaging DMD array. Turning now to the present invention as shown in FIG. 1, intensity modulation of a light source is achieved by using DMD optical switch 26 in combination with a single conventional high-intensity tungsten lamp 14. Optical switch 26 is a reflective type switch, in contrast to a transmissive type switch such as an LCD switch, whereby each micromirror 52 of array 28 has an on or off position. In the on position, incident light is reflected by that particular mirror 52 along optical axis 16 to spectral filter 32. In the off position, light is reflected along line 54 and passed to a light collector 56.

Figure 2A:
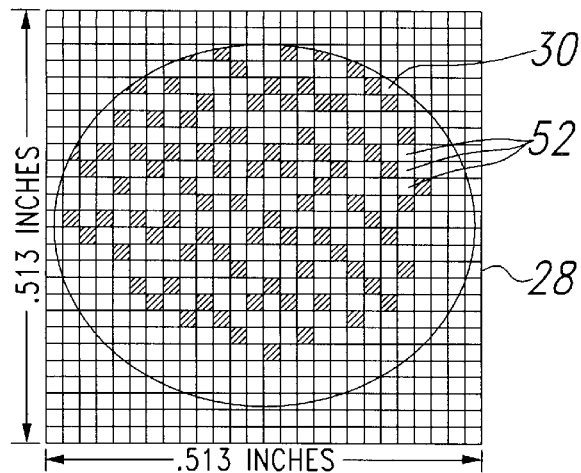
FIGS. 2A and 2B are diagrams illustrating the DMD as an optical switch with particular mirrors in the on position to pass a proportionate and uniformly dispersed intensity of light to the imaging DMD for exposing the xerographic photoreceptor drum.
Figure 2B:
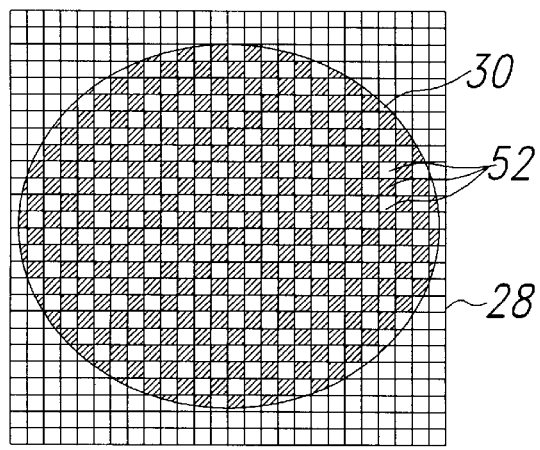

Referring to FIGS. 2A and 2B, illustrative diagrams are presented to illustrate the portion 30 of mirror array 28 which is implemented to modulate the intensity of incoming light 15. As shown, an array of 17 micron square mirrors 52 are each individually deflectable between an on and off position, to either pass incident light to or away from light integrator 38, respectively. While only a few micromirrors 52 are shown for purposes of illustration, array 28 preferably comprises an array of 600 by 600 mirrors (360,000 total), with about 300,000 mirrors falling within the generally elliptically shaped illuminated portion 30. As shown in FIG. 2A, 75% of the mirrors 52 are shown in the on position as "white" pixels. These on mirrors 52 in turn reflect the portion of incident light along optical path 16 to filter 32 and light integrator 36. The off mirrors 52 are the "dark pixels", these mirrors reflecting the respective incident light along line 54 to the light collector 56. With 75% of these mirrors in the on position, as shown in FIG. 2A, 75% of the incident light to array portion 30 will be reflected along optical axis 16 to filter 32 and light integrator 36.

Similarly, as shown in FIG. 2B, with 50% of the mirrors 52 in the on position, 50% of the incident light to array portion 30 is reflected along optical axis 16 to filter 32 and light integrator 36. Likewise, 50% of the incident light is reflected by the mirrors in the off position along axis 54 and directed to the light collector 56. As shown in FIGS. 2A and 2B, the mirrors in the on positioned are selected to be uniformly dispersed to pass, as a whole, a balanced light beam.

Figure 3:
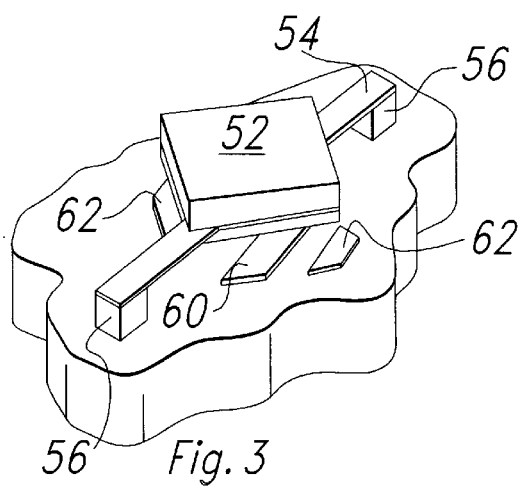
FIG. 3 is a perspective view of one bistable DMD micromirror pixel comprising both the DMD optical switch and the imaging DMD.
Figure 4:
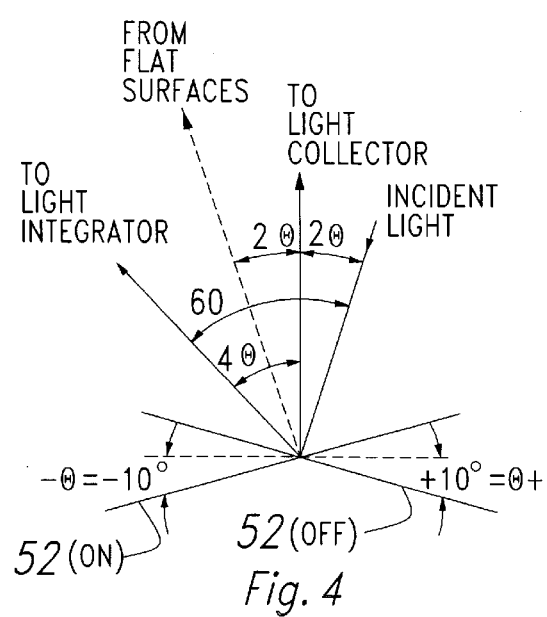
FIG. 4 is an optical schematic diagram of the light modulation achieved using the DMD micromirror of FIG. 3 as used in the optical switch of FIG. 1.

Referring to FIG. 3 and FIG. 4, a basic DMD mirror 52 structure, and bistable operation for light modulation thereof, respectively, is shown. Mirror 52 is supported by a pair of collinear hinges 54 and support posts 56 above an addressing substrate 58. Substrate 58 supports a corresponding pair of addressing electrodes 60 driven by an SRAM cell (not shown), and mirror tip landing pads 62. Switching control electronics 64 provides voltages to electrodes 60 via the SRAM cell, as shown in the cross referenced patents, to electrostatically deflect mirror 52. Referring to FIG. 4, each bistable mirror 52 can rotate plus/minus 10 degrees ($\theta$) between an on and off position, either directing incident light (15) from collector lens 20 to or away from filter 32 and light integrator 38, respectively.

As shown in FIG. 1, lamp 14 is laterally positioned from integrator 38, with lamp 14 and condensing lens 20 shown to focus light from element 22 at a 60 degree angle (6$\theta$) with respect filter 32 and front face 36 of light integrator 38. That is to say, when the mirrors 52 of array 28 are in the on position, light is reflected along path 16 at a 60 degree angle from condensing lens 20 to filter 32 and light integrator 36. Since each of these mirrors 52 have a plus or minus 10 degree swing from a flat position, as shown in FIG. 4, for a total of 20 degrees rotation, light is reflected back along optical axis 54 at 20 degrees from the incident light when the mirrors are in the off position. This arrangement is particularly useful in spacing lamp 14 and lens 20 away from the optical elements including filter 32 and integrator 38, and achieving a densely packed arrangement for packaging. In addition the center axis of integrator 38 is angled 14 degrees from a line normal to the face of imaging DMD 46, both in the horizontal and vertical direction, so as to not interfere with the imaged light directed by DMD 46 into the focusing projector lens 50.

By implementing an optical DMD switch 26 at the front end of the optical system 10, the intensity of light ultimately illuminating DMD imaging array 48 can be precisely modulated to further enhance gray scale printing. As shown in FIG. 1, switching control electronics 64 is provided to control DMD imaging array 46 as is well known in the art and discussed in the cross referenced patents, and which control electronics 64 also control the switching (deflection) of mirrors 52 of optical switch 26 to modulate the incident light from lamp source 14 such as shown in FIGS. 2A and 2B. Electronics 64 preferably comprises row addressing circuitry and column pixel data loading shift registers. Electronics 64 simultaneously controls optical switch 26 and DMD array 46 individually, but as a function of one another. Accordingly, the DMD array 46 modulates the varying flux density light beam from DMD array 26. In particular, the on time of the mirrors in array 46 is controlled during a line print frame to control the gray scale of the pixel image generated by each mirror, as discussed in the several cross referenced patents. In addition, the on time of selected mirrors 52 of switch 26 is also controlled to control the intensity or flux density of light being uniformly projected upon and illuminating DMD switch 46. Because optical switch 26 is a reflective type switch, there is little loss in this device, and a majority of the light intensity will be transmitted to filter 32 and light integrator 36 when all mirrors 52 are in the on position. In contrast, implementing a transmissive type optical switch, such as an LCD switch, would generate significantly higher losses even when this switch would be in the fully on position. In addition, an LCD rise and fall time will be longer than the DMD.

As shown in FIGS. 2A and 2B, because array 28 is comprised of tiny micromirrors 52, each mirror typically being 17 microns square, the intensity of light transmitted to filter 32 can be precisely established. In the preferred embodiment, array portion 30 is generally elliptical, as shown, with a horizontal major axis of about one-half inch in diameter, and includes about 300,000 mirrors. In the case of the DMD, even if some of these mirrors 52 are defective, even with say 1,000 being defective, this still only represents about 0.3% of the usable mirrors 52 of array portion 30. Thus, a few damaged pixel mirrors will not noticeably effect the accuracy of the overall intensity of the modulated incident light, and can be compensated for by simply not using the known defective mirrors.

Referring now to FIG. 5, an alternative preferred embodiment to the present invention is shown as optical illumination system 70. Optical system 70 is very similar to optical system 10 as previously discussed and shown in FIG. 1. However, a light valve 72, such as a LCD switch matrix, is implemented in place of DMD imaging array 46. Light valve 72 is of the transmissive type, rather than the reflective type as the case of the DMD imaging array 46. The remaining portions of this embodiment are identical to that of FIG. 1, and are discussed previously. The homogenized light passed to light valve 72 is selectively controlled by switching control electronics 64 to create an imaged light, this imaged light being focused by projector lens 50 onto photoreceptor drum 12. As shown in FIGS. 1 and 5, the present invention is not limited to the particular type of imaging array which controls the imaging and exposure of photoreceptor drum 12.

The present invention finds technical advantages as a low cost, high intensity, homogeneous light source arrangement. A single high-intensity continuous wave tungsten lamp 14 is implemented, together with an affordable high resolution and high speed optical switch 26 to provide a modulated intensity light source illuminating the imaging DMD 46. The condensing lens directs the high intensity light on the mirror array portion 30 of switch 26, and focuses the light on the light integrator 36, whereby this lens, switch, and optical integrator are inexpensive and easy to optically align. Optical switch 26 is optically efficient since it is a reflective type switch and generates little optical losses.

Moreover, the DMD switch 26 has thousands of mirrors which can be switched on and off in as little as one nanosecond, thus lending to high switching speeds to achieve precise modulation of the incident light. Light can be reflected by each mirror for only a fractional portion of the print line window, thus helping to reduce the smearing effect which tends to be produced when exposing a rotating receptor drum. As shown in FIGS. 2A and 2B, selected mirrors can be turned on to precisely effect the overall percentage of light that is ultimately reflected to imaging array 46. By evenly distributing which mirrors are on and off, a uniform and balanced light pattern is reflected to light integrator 36. As shown in FIG. 2B, even when 50% of the mirrors are in the off position to reflect only 50% of the light impinging array portion 30, still, a uniform distribution of light is reflected by the distribution of on mirrors.

The single lamp 14 produces an abundance of light energy, with enough light being captured by condensing lens 20 for adequately irradiating DMD imaging array 46. In contrast, the High Output LED array as shown in the prior art, is expensive, with the best available LED's producing only 200 milliwatts. While an LED can switch on and off fast enough, utilizing an array of LED, such as a linear array of thirty two LED's, is very expensive because of the electronics required to drive and adjust each LED to achieve uniformity. By implementing an affordable DMD optical switch, the individual mirrors can be quickly turned on and off to modulate the incident continuous wave light.

In the embodiments shown, a conventional 50 watt tungsten lamp 14 in combination with an aspheric condensing lens 20, DMD optical switch 26 and light integrator 36 can be provided for less than $50.00. This is considerably less expensive than the LED array of the prior art, which may cost hundreds of dollars. In addition, one malfunctioning LED in an LED array may be noticeable in the optical system. The loss of several mirrors, even hundreds of mirrors, would not noticeably degrade the uniformity or intensity of light ultimately impinging imaging array 46. Mirrors which are known to be bad can be ignored by control electronics 64, whereby only the functional mirrors can be implemented to modulate the incident light. Finally, the implementation of a single light source focused on the light integrator provides an efficient light homogenizer for the evenly illuminating an imaging device, such as the DMD imaging array 46.

In summary, a single conventional continuous wave incandescent light in combination with a robust DMD-type optical switch is utilized to provide a low cost, fast, high intensity modulated light source for illuminating a DMD-type imaging array. A low cost, typically plastic, light integrator is used to collect and homogenize the modulated light from the DMD optical switch and uniformly irradiate the DMD imaging array 46. With 300,000 mirrors residing within array portion 30, the resolution of the variable intensity light directed to filter. 32 and light integrator 36 can be precisely controlled. By controlling the distribution of the on and off pixels, as shown in FIGS. 2A and 2B, the uniformity of the light passed to filter 32 and integrator 36 is also controlled. Since the optical DMD switch 26 is similar in design to the DMD imaging array 46, the switching control electronics is well suited to control both of these devices simultaneously, and as a function of one another to achieve gray scale printing. Thus, additional complicated and expensive control electronics is not necessary. The DMD switch is a reflective type switch, rather than a transmissive type switch, and thus can reflect a height intensity light with little loss. The lamp source and condensing lens are angled 60 degrees from the spectral filter and light integrator, and thus are advantageously spaced from one another for tight packaging without interfering with one another.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications. For instance, refractive toroidal lens 40 could be substituted with a reflective toroidal mirror to reduce the front-to-back depth of system 10, and possibly reduce spherical aberrations, or be removed all together although this is not desired. In addition, the light source 15 could be directed by condensing lens 20 to overfill the DMD array 28 with light, with mirror portion 30 modulating the associated incident light.

I claim:

1. An illumination system for exposing a xerographic printing apparatus, comprising:
   a) a spatial light modulator receiving and modulating an incoming varying flux density light beam to expose said xerographic printing apparatus;
   b) a light source providing a continuous wave light; and
   c) an optical switch converting incoming said continuous wave light to said varying flux density light beam, and passing said varying flux density light beam to said spatial light modulator.

2. The illumination system as specified in claim 1 wherein said optical switch consists of a reflective-type optical switch directing said varying flux density light beam to said spatial light modulator.

3. The illumination system as specified in claim 2 wherein said spatial light modulator is offset at least 40 degrees from said continuous wave light source with respect to said optical switch.

4. The illumination system as specified in claim 1 wherein said optical switch comprises a first DMD.

5. The illumination system as specified in claim 1 wherein said light source comprises an incandescent lamp.

6. The illumination system as specified in claim 1 wherein said spatial light modulator comprises a second DMD.

7. The illumination system as specified in claim 1 further comprising a light integrator positioned between said optical switch and said spatial light modulator and homogenizing said varying flux density light beam.

8. The illumination system as specified in claim 1 further comprising a condensing lens positioned between said continuous wave light source and said optical switch.

9. The illumination system as specified in claim 7 further comprising a toroidal lens positioned between said light integrator and said spatial light modulator.

10. The illumination system as specified in claim 1 further comprising a spectral filter positioned between said optical switch and said spatial light modulator.

11. The illumination system as specified in claim 8 wherein said condensing lens is aspherical.

12. The illumination system as specified in claim 9 wherein said toroidal lens is aspherical.

13. The illumination system as specified in claim 1 further comprising circuit means for coordinating control of said optical switch with said spatial light modulator.

14. A method of exposing a xerographic printing apparatus, comprising the steps of:
   a) generating a continuous wave light source;
   b) modulating said continuous wave light source with an optical switch to provide a varying flux density light beam;
   c) modulating said varying flux density light beam with a spatial light modulator to generate an image; and
   d) exposing said xerographic printing apparatus with said image.

15. The method as specified in claim 14 including the step of utilizing a DMD as an optical switch to modulate said continuous wave light source.

16. The method as specified in claim 14 including the step of utilizing a DMD as a spatial light modulator to modulate said varying flux density light beam.

17. The method as specified in claim 14 further comprising the step of coordinating said step (b) with said step (c) to controllably expose said xerographic printing apparatus.

* * * * *